United States Patent
McBride et al.

(10) Patent No.: US 8,127,082 B2
(45) Date of Patent: Feb. 28, 2012

(54) METHOD AND APPARATUS FOR ALLOWING UNINTERRUPTED ADDRESS TRANSLATIONS WHILE PERFORMING ADDRESS TRANSLATION CACHE INVALIDATES AND OTHER CACHE OPERATIONS

(75) Inventors: Chad B. McBride, Rochester, MN (US); Andrew H. Wottreng, Rochester, MN (US); John D. Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 11/344,900

(22) Filed: Feb. 1, 2006

(65) Prior Publication Data

US 2007/0180195 A1    Aug. 2, 2007

(51) Int. Cl.
  *G06F 12/00*  (2006.01)
(52) U.S. Cl. .................. 711/140; 711/E12.047; 711/169
(58) Field of Classification Search .................. 711/127, 711/140
  See application file for complete search history.

(56) References Cited

U.S. PATENT DOCUMENTS

| | | | |
|---|---|---|---|
| 6,625,694 B2 * | 9/2003 | Masri et al. ................... | 711/133 |
| 7,401,208 B2 * | 7/2008 | Kalla et al. .................... | 712/224 |
| 2002/0169929 A1 * | 11/2002 | Riedlinger et al. ........... | 711/140 |
| 2006/0236001 A1 * | 10/2006 | Tanabe ............................ | 710/22 |

FOREIGN PATENT DOCUMENTS

EP    689130 A1 * 12/1995

* cited by examiner

*Primary Examiner* — Reginald Bragdon
*Assistant Examiner* — Baboucarr Faal
(74) *Attorney, Agent, or Firm* — Patterson & Sheridan LLP

(57) ABSTRACT

A method and apparatus for allowing multiple devices access to an address translation cache while cache maintenance operations are occurring at the same time. By interleaving the commands requiring address translation with maintenance operations that may normally take many cycles, address translation requests may have faster access to the address translation cache than if maintenance operations were allowed to stall commands requiring address translations until the maintenance operation was completed.

23 Claims, 4 Drawing Sheets

METHOD AND APPARATUS FOR ALLOWING UNINTERRUPTED ADDRESS TRANSLATIONS WHILE PERFORMING ADDRESS TRANSLATION CACHE INVALIDATES AND OTHER CACHE OPERATIONS

BACKGROUND OF THE INVENTION

1. Field of the Invention

The present invention generally relates to address translation and cache maintenance operations involving the address translation caches within a central processing unit.

2. Description of the Related Art

Computing systems often include central processing units (CPUs) to perform operations relating to the processing of data. The data processed by a processor may include instructions, which are executed by the processor, as well as data which is manipulated by the processor using the instructions. Computing systems also include memory used to store data and instructions for later use.

To provide for faster access to data and instructions, as well as better utilization of the processor, the processor may have several caches. A cache is a memory which is typically smaller than the main memory of the computer system and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 Cache (L2 cache).

A processor may also utilize a specialized cache to store command address translation information. Such an address translation cache (commonly referred to as a translation look-aside buffer or TLB) may store information to match the virtual address of a command to the physical address of the command. The address translation cache is used to improve the speed of translation of a virtual address to a physical address.

Due to the small size of the cache in comparison to the size of main memory, caches normally have a mechanism for invalidating entries in the cache so that the storage location can be re-used by another cache entry. This invalidation operation can be performed by hardware or software. Software invalidate operations can come in the form of a processor command or a read or a write to a register.

A problem exists when two separate input/output (I/O) devices wish to use the address translation cache at the same time. One device may desire to perform some sort of cache maintenance while another device may wish to use the cache for address translation purposes. For example, one device may desire to invalidate large groups of cache entries while another device expects uninterrupted high speed address translation. To clarify, the invalidates cause cache entries used for high speed address translation to be marked for replacement. If the large group of invalidates is received first, the later received address translation request is stalled until the large group of invalidates is finished. The stalling of a later received address translation request negatively impacts the overall performance of the processor and consequently the computing system.

Therefore, there is a need for an improved method and apparatus for allowing uninterrupted address translation while performing cache maintenance operations.

SUMMARY OF THE INVENTION

The present invention generally provides a method and apparatus for allowing uninterrupted address translation while performing cache or TLB maintenance operations.

One embodiment provides a method for allowing access to an address translation pipeline. The method generally includes (a) interleaving, within clock cycles of the address translation pipeline, maintenance cycles with functional cycles; (b) allowing functional commands, corresponding to requests for address translation, to access the address translation pipeline during a functional cycle; and (c) allowing maintenance commands, corresponding to requests to modify or read at least one of an address translation cache or a translation look-aside buffer, to access the address translation pipeline during a maintenance cycle.

Another embodiment provides a processing device generally including an address translation pipeline, at least one of an address translation cache or a translation look-aside buffer, and pipeline controller logic. The pipeline controller logic is generally configured to interleave, within clock cycles of the address translation pipeline, maintenance cycles with functional cycles, to allow functional commands, corresponding to requests for address translation, to access the address translation pipeline during a functional cycle; and to allow maintenance commands, corresponding to requests to modify or read at least one of the address translation cache or the translation look-aside buffer, to access the address translation pipeline during a maintenance cycle.

Another embodiment provides a system generally including one or more input/output (I/O) devices and a processing device. The processing device generally includes an address translation pipeline for providing access to a translation look-aside buffer or an address translation cache, and pipeline controller logic. The pipeline controller logic is generally configured to interleave, within clock cycles of the address translation pipeline, maintenance cycles with functional cycles, to allow functional commands, corresponding to requests for address translation, to access the address translation pipeline during a functional cycle, and to allow maintenance commands, corresponding to requests to modify or read from at least one of the address translation cache or the translation look-aside buffer, to access the address translation pipeline during a maintenance cycle.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides a way to allow multiple Devices access to an address translation cache (commonly referred to as a translation look-aside buffer or TLB) while cache maintenance operations are occurring at the same time. By interleaving the commands requiring address translation with maintenance operations that may normally take many cycles, address translation requests can have faster access to the address translation cache than if maintenance operations were allowed to stall commands requiring address translations until the maintenance operation was completed.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

Figure 1:
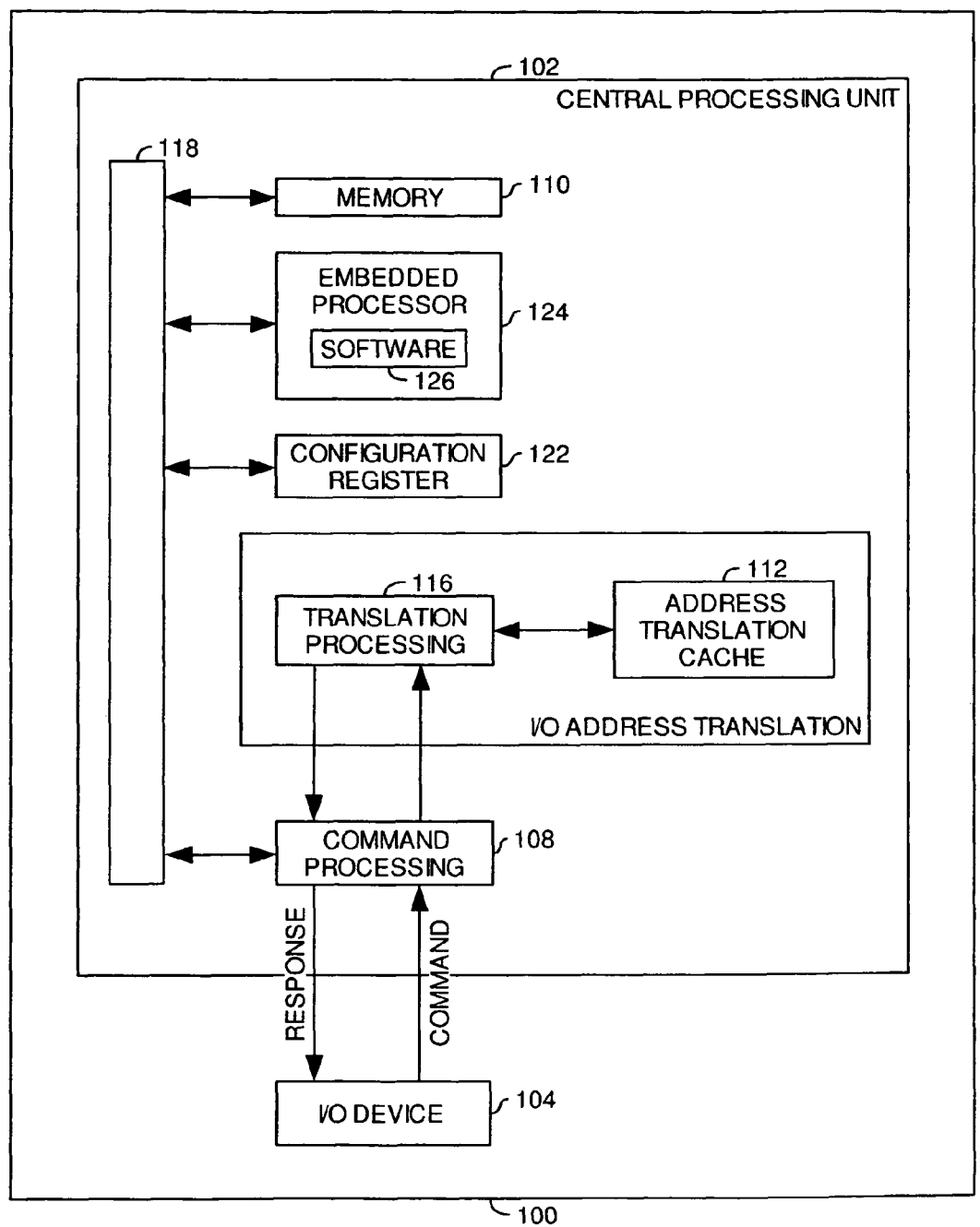
FIG. 1 is a block diagram illustrating an exemplary computing environment, according to one embodiment of the invention.

FIG. 1 is a block diagram illustrating a central processing unit (CPU) 102 coupled to an I/O device 104, according to one embodiment of the invention. In one embodiment, the CPU 102 may reside within a computer system 100 such as a personal computer or gaming system. The I/O device 104 may also reside within the same computer system. In a modern computing system there may be a plurality of I/O devices 104 attached to the CPU 102. For example, an I/O device 104 may consist of random access memory (RAM), a video card, or a hard drive. The I/O device 104 may be physically attached to the CPU 102 inside of the computing system by means of a bus.

An I/O device 104 will send commands to the CPU 102 for execution. The CPU 102 may respond to the I/O device 104 with a result. In one embodiment, a command processing system 108 may reside within the CPU 102. Within the command processing system 108 commands sent from I/O devices 104 are stored and prepared for execution by the CPU 102. A CPU 102 may also contain translation processing logic 116, memory 110 and an address translation cache 112 to aid in the translation of virtual memory addresses to physical memory addresses. Within the address translation may reside a page table cache and a segment table cache. The CPU 102 may also contain a configuration register 122 for reading and writing configuration data related to the CPU 102 status and configuration. Furthermore, the CPU 102 may contain an embedded processor 124 for executing commands ready for processing. The embedded processor 124 may also be executing software 126. The CPU may contain an on-chip bus 118 which connects various devices within the CPU.

Figure 2:
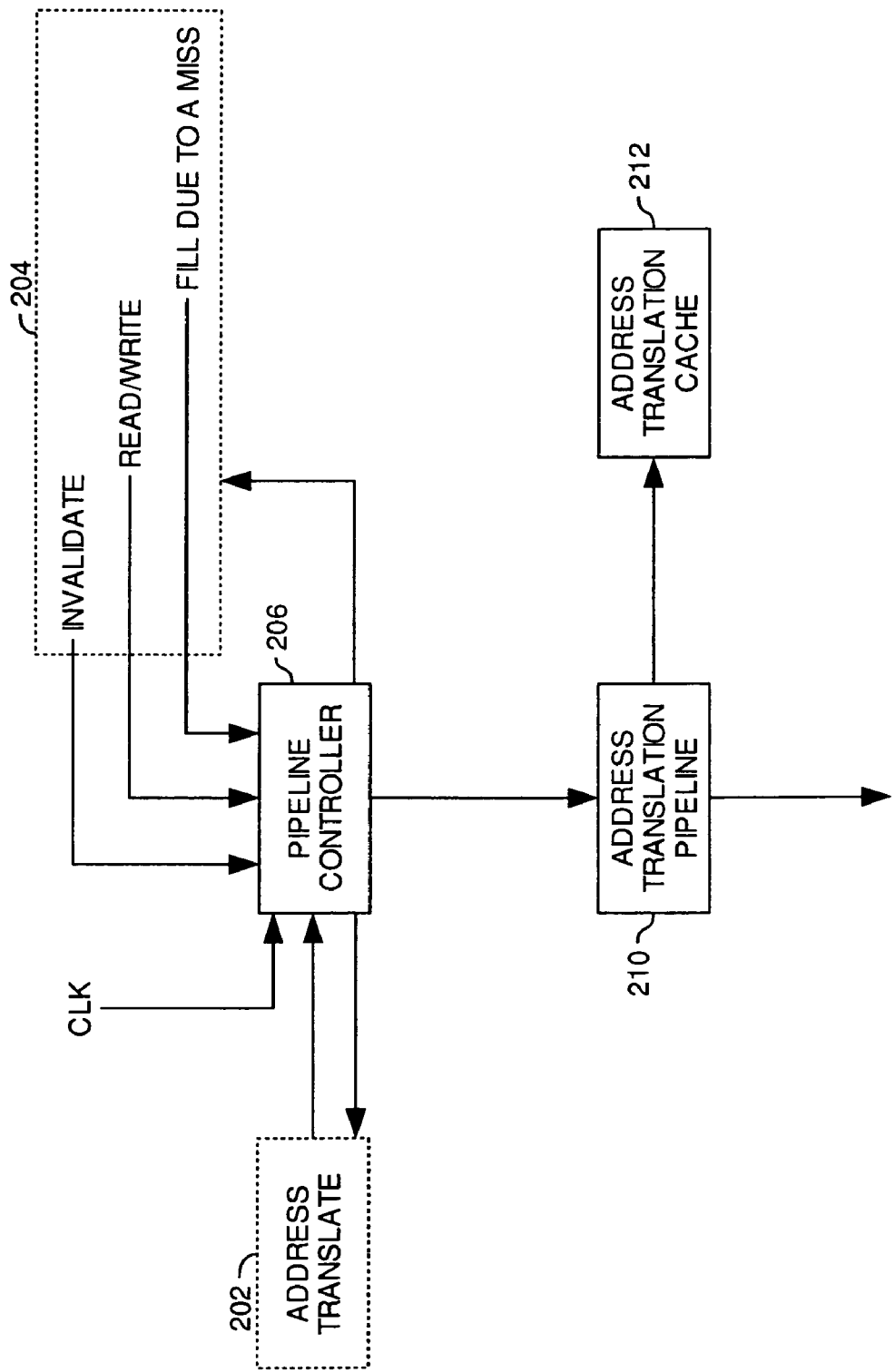
FIG. 2 is a block diagram illustrating shared functional and maintenance command access to an address translation cache through an address translation pipeline, according to one embodiment of the invention.

For some embodiments, translation processing 116 may be configured to allow functional (address translation) access to an address translation cache while cache maintenance operations are occurring at the same time. FIG. 2 further illustrates the translation processing logic 116.

FIG. 2 is a block diagram illustrating functional 202 and maintenance 204 access to an address translation cache 212 through an address translation pipeline 210, according to one embodiment of the invention. The address translation cache 212 may be made up of a segment table cache and a page table cache.

Commands sent to the address translation pipeline 210 may be separated into two groups. The first group consists of functional commands 202. A functional command is a request for translation of a virtual address to a physical address. The second group consists of maintenance commands sent to perform maintenance oriented operations 204 on the address translation cache 212.

Some examples of maintenance oriented operations 204 are invalidates, reads or writes, and a fill due to an address translation cache miss. An invalidate operation is an operation which invalidates an entry within a page table cache/TLB or a segment table cache/TLB. The invalidate operation marks an entry in the cache. A read or write allows access into the cache so that software can read or write cache entries. Lastly, a fill due to a miss operation is an operation that occurs when hardware updates the cache in response to a cache miss. A cache miss occurs when a request for address translation containing a virtual address is presented to the address translation cache 212, but the virtual address is not present in the address translation cache 212. A request to main memory is then made to fetch the data needed to fill the address translation cache. The address translation cache 212 is then filled with the fetched data.

For some embodiments of the invention, to allow access to the address translation cache 212 while cache maintenance operations are occurring at the same time, a pipeline controller 206 may interleave functional commands or address translation requests 202 and maintenance commands or maintenance operations 204 into the address translation pipeline 210. That is, the pipeline controller 206 may allow an address translation request 202 into the address translation pipeline 210 for every maintenance operation 204 allowed into the address translation pipeline, regardless if a maintenance task involving many maintenance operations 204 is finished.

For example, a large block of data within the address translation cache 212 (i.e., multiple lines within the cache) may need to be invalidated. This block invalidate may take many cycles of invalidate operations before it is complete. Assuming that invalidating each line in the block takes one invalidate operation and each invalidate operation takes one cycle, the entire block invalidate will take many cycles to complete. In one embodiment of the invention, instead of stalling any address translation requests received after the block invalidation was received, the pipeline controller 206 may interleave address translation requests within the individual invalidate operations.

To accomplish this, the pipeline controller 206 may be configured to allow an address translation request 202 into the address translation pipeline 210 for every clock cycle it allows a maintenance operation 204 into the address translation pipeline 210. This allows one command needing address translation 202 into the address translation pipeline 210 every other cycle regardless if the block invalidate is complete.

For some embodiments, the pipeline controller 206 may be configured such that after interleaving, the pipeline receives approximately 50% functional commands and 50% maintenance commands. However, other embodiments of the invention may have a different ratio of functional commands to maintenance commands. For example, another embodiment of the invention may allow two commands needing address translation 202 into the address translation pipeline 210 for every maintenance operation 204 allowed into the pipeline. Yet another embodiment may allow three commands needing address translation 202 into the address translation pipeline 210 for every maintenance operation 204 allowed into the address translation pipeline 210. An endless amount of variations of the ratio of commands needing address translation 202 to maintenance operations 204 allowed into the address translation pipeline 210 may be controlled by the pipeline controller 206.

In one embodiment of the invention, the different maintenance oriented operations may be alternated amongst themselves so that only one maintenance type operation per maintenance cycle is placed into the address translation pipeline 210. For example, three maintenance oriented operations 204 (i.e., invalidate, register reads or writes, and fill due to a miss) may all be directed by other CPU 102 logic into the pipeline controller 206. The pipeline controller 206 may then repeatedly interleave, on maintenance cycles, the three maintenance operations so that each one is allowed into the address translation pipeline in a predetermined order, time after time, for example, in a round-robin manner.

For example, for the first maintenance cycle determined by the pipeline controller 206, the pipeline controller 206 may allow an invalidate operation. On the next maintenance cycle a register read or write may be allowed. Then, on the third maintenance cycle, a fill due to a miss operation may be allowed. After the third operation is allowed into the address translation pipeline 210, the pipeline controller 206 would then repeatedly allow the maintenance commands, one-by-one, in the same order, on maintenance cycles, into the address translation pipeline 210. This way the pipeline controller 206 equally shares the access to the address translation pipeline 210 for each of the different types of maintenance commands.

After the pipeline controller 206 has selected either a request for address translation or a maintenance operation, the pipeline controller 206 allows the selected request or operation access to the address translation pipeline where the maintenance operation or request has access to the address translation cache 212 in order to perform its corresponding function (reading, writing, or modifying one of the cache entries).

In one embodiment of the invention, the pipeline controller logic 206 may also be configured to send a response back to the logic which sent the maintenance command or the functional command. This signal may be used to determine when a response to a functional command or a maintenance command may be present at the output of the address translation pipeline.

Exemplary Operations

Figure 3:
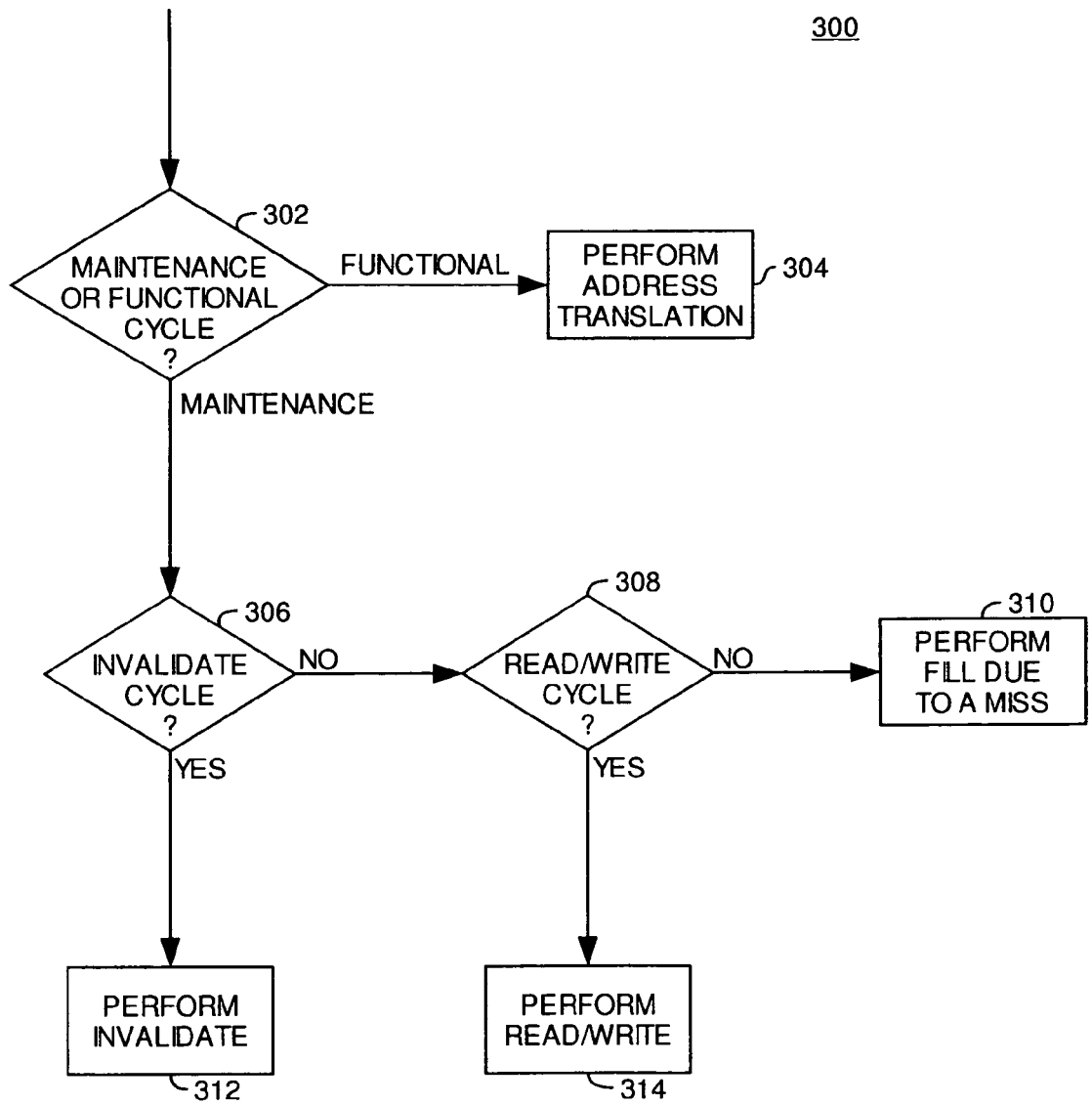
FIG. 3 is a flowchart illustrating the interleaving of functional and maintenance commands, according to one embodiment of the invention.

FIG. 3 is a flowchart illustrating an operation 300 of interleaving functional and maintenance commands, according to one embodiment of the invention.

In one embodiment of the invention, processor logic, such as the pipeline controller 206, may perform the operations 300 as illustrated in FIG. 3. The pipeline controller 206 may begin the operation by determining whether the current cycle is a maintenance cycle or a functional cycle as seen at step 302. If it is a functional cycle, then an address translation request for a command will be sent to the pipeline logic at step 304.

However, if the cycle is a maintenance cycle then a series of determinations may be made by logic to determine which maintenance operation is being performed on that particular cycle. The first of those determinations may be whether the current cycle is a invalidate cycle or not, as seen at step 306. If so, then invalidation may be performed at step 312. If not, then a determination may be made at step 308 to determine if it is a read or write cycle. If so, then a read or write will be preformed at step 314. If it is not a read or write cycle, then the last of three possible maintenance operations, a fill due to a miss, may be performed at step 310.

Exemplary System and Timing Diagram

Figure 4A:
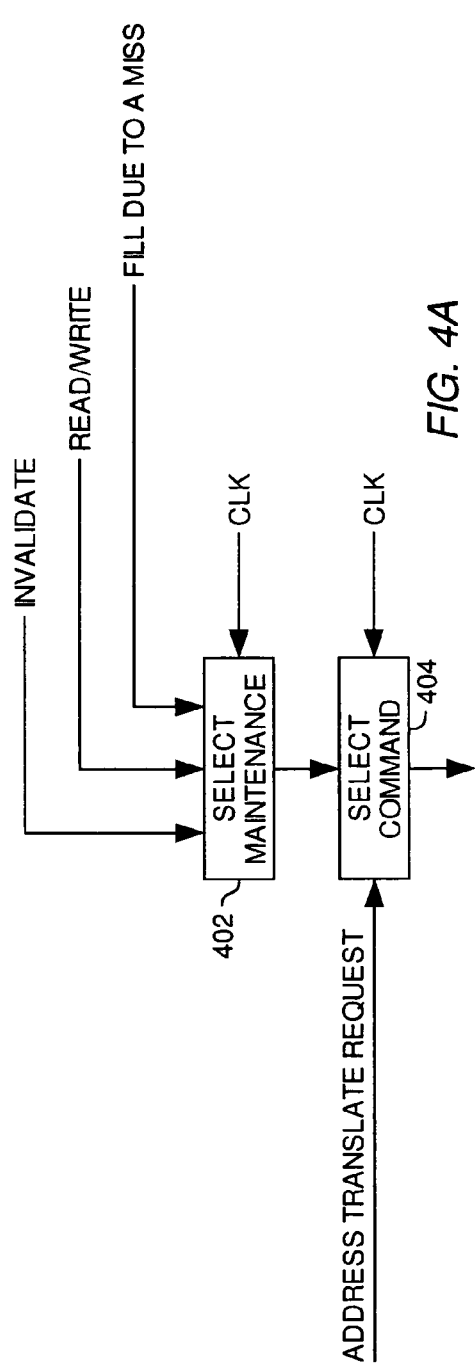
FIG. 4A is a block diagram illustrating exemplary logic used to interleave functional and maintenance commands, according to one embodiment of the invention.
Figure 4B:
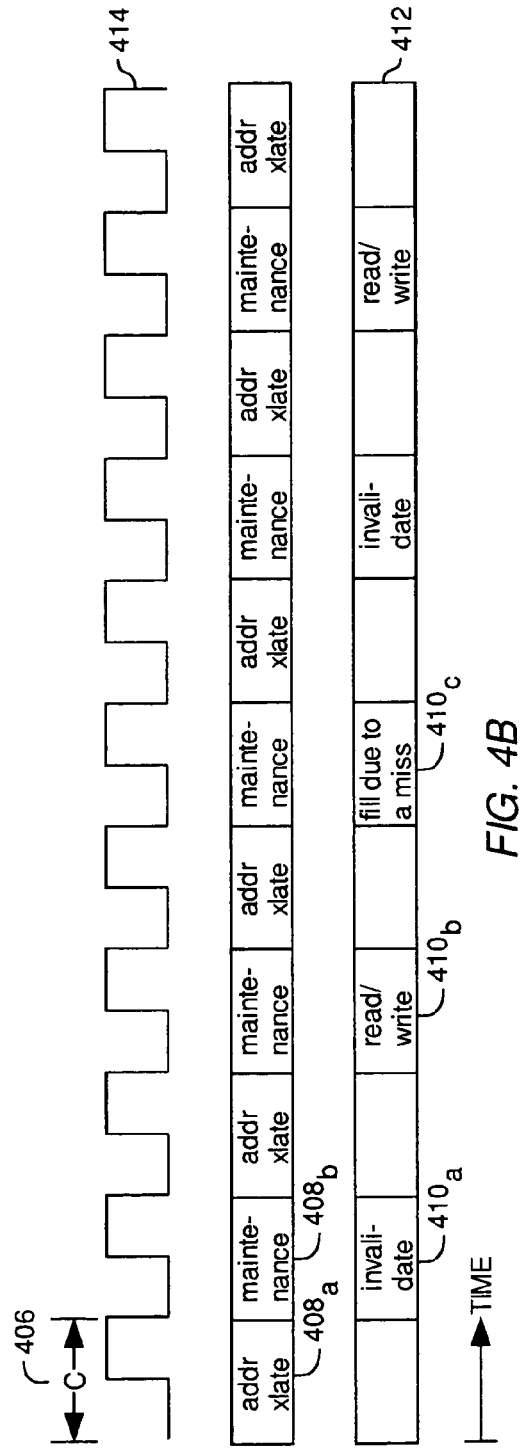
FIG. 4B is a timing diagram illustrating the interleaving of functional and maintenance commands, according to one embodiment of the invention.

FIG. 4A illustrates select logic which may be used to interleave functional commands and maintenance operations, according to one embodiment of the invention. FIG. 4B is a timing diagram illustrating the interleaving of functional commands and maintenance operations, according to one embodiment of the invention.

FIG. 4A is a block diagram illustrating logic 400 that may be used to select which operation will have access to the address translation pipeline 210. The logic 400 may be one embodiment of the pipeline controller 206 discussed in FIG. 2. This logic 400 may be composed of select maintenance logic 402 and select command logic 404. The select maintenance logic 402 may be connected to a clock signal to determine when a maintenance operation should be allowed through to the select command logic 404. The select maintenance logic 402 may send a maintenance operation through to the select command logic 404 every other cycle of the clock. In one embodiment of the invention, the select maintenance logic 402 may start with the invalidate command and then round robin through the other maintenance operations, sending a different one to the select command logic 404 every other cycle of the clock.

In other embodiments of the invention, the select maintenance logic 402 may choose the command to be issued to the select command logic 404 via any other arbitration scheme. For example, in another embodiment of the invention the select maintenance logic 402 may choose the command to be issued to the select command logic 404 via a priority select arbitration scheme, rather than a round robin arbitration scheme. Any type of arbitration scheme known to those skilled in the art may be utilized.

The select command logic 404 may determine when a maintenance command or an address translation request will be sent to the address translation pipeline 210, according to one embodiment of the invention. The select command logic 404 may be connected to the clock to determine when to send either a request for address translation or a maintenance operation to the address translation pipeline 210.

For each cycle 406 of the clock 414, the select command logic 404 may send either a request for address translation 408a or a maintenance operation 408b to the address translation pipeline 210. In one embodiment of the invention, a request for address translation 408a is first sent to the address translation pipeline 210 by the select command logic 404. The determination to send a request for address translation 408a first may be made by the select command logic 404. The next cycle of the clock, a maintenance operation 408b is sent to the address translation pipeline 210. This first maintenance operation 408b may be an invalidate operation 410a, as is determined by the select maintenance logic 402, according to one embodiment of the invention.

On the next clock cycle a request for address translation is again sent to the address translation pipeline 210. On the next clock cycle another maintenance operation is sent to the address translation pipeline 210. This being the second maintenance operation cycle, a read or write operation 410b may be sent to the address translation pipeline 210. On the next cycle of the clock another request for address translation is sent to the address translation pipeline 210. On the next clock cycle another maintenance operation is sent to the address translation pipeline 210. This being the third maintenance operation cycle, a fill due to a miss operation 410c may be sent to the address translation pipeline 210.

The select maintenance logic 402 and the select command logic 404 may repeat this order of requests and maintenance operations sent to the address translation pipeline 210 as indicated in FIG. 4B. Thus, the select maintenance logic 402 and the select command logic 404 will have successfully interleaved commands requiring address translation with maintenance operations.

CONCLUSION

By interleaving maintenance commands with functional commands, address translation requests will not be stalled behind large blocks of earlier received maintenance operations. Therefore, uninterrupted address translation during maintenance operations will be achieved.

While the foregoing is directed to embodiments of the present invention, other and further embodiments of the invention may be devised without departing from the basic scope thereof, and the scope thereof is determined by the claims that follow.

What is claimed is:

1. A method for allowing access to an address translation pipeline, comprising:
   interleaving, within clock cycles of the address translation pipeline, maintenance cycles with functional cycles to achieve a predetermined ratio of maintenance cycles to functional cycles;
   allowing functional commands, corresponding to requests for address translation, to access the address translation pipeline during a functional cycle;
   selecting a maintenance command to gain access to the address translation pipeline during a maintenance cycle based on a predetermined order, the predetermined order requiring different maintenance command types to gain access to the address translation pipeline during consecutive maintenance cycles; and
   allowing the selected maintenance command, corresponding to a request to read or modify at least one of an address translation cache or a translation look-aside buffer, to access the address translation pipeline during the maintenance cycle.

2. The method of claim 1, wherein interleaving maintenance cycles with functional cycles comprises:
   allocating some of the address translation pipeline cycles as maintenance cycles and the rest of the pipeline cycles as functional cycles.

3. The method of claim 1, wherein functional commands comprise requests for address translation using the translation look-aside buffer or the address translation cache.

4. The method of claim 1, wherein a type of the maintenance command is one of an address translation cache entry invalidate, a read or write, and a fill due to an address translation cache miss.

5. The method of claim 4, wherein the predetermined order is assigned in a round-robin manner based on a number of the maintenance command types.

6. The method of claim 1, wherein an address translation pipeline provides access to a translation look-aside buffer or an address translation cache.

7. The method of claim 1, further comprising sending signals to devices which sent the functional or maintenance command, wherein the signals are used to determine when a response, generated by executing the functional or maintenance command, will be available at an output of the address translation pipeline.

8. The method of claim 1, further comprising sending a timing signal to a device to determine when the maintenance command can be sent to the address translation pipeline.

9. A processing device, comprising:
   an address translation pipeline;
   an address translation cache; and
   pipeline controller logic configured to:
      interleave, within clock cycles of the address translation pipeline, maintenance cycles with functional cycles to achieve a predetermined ratio of maintenance cycles to functional cycles,
      allow functional commands, corresponding to requests for address translation, to access the address translation pipeline during a functional cycle,
      select a maintenance command to gain access to the address translation pipeline during a maintenance cycle based on a predetermined order, the predetermined order requiring different maintenance command types to gain access to the address translation pipeline during consecutive maintenance cycles, and
      allow the selected maintenance command, corresponding to a request to modify or read at least one of the address translation cache or a translation look-aside buffer, to access the address translation pipeline during the maintenance cycle.

10. The processing device of claim 9, wherein the pipeline controller logic allocates some of the pipeline cycles as maintenance cycles and the rest of the pipeline cycles as functional cycles.

11. The processing device of claim 9, wherein functional commands comprise requests for address translation using the translation look-aside buffer or the address translation cache.

12. The processing device of claim 9, wherein a type of the maintenance command is one of an address translation cache invalidate, a read or write, and a fill due to an address translation cache miss.

13. The processing device of claim 12, wherein the predetermined order is assigned in a round-robin manner based on a number of the maintenance command types.

14. The processing device of claim 9, wherein an address translation pipeline provides access to the translation look-aside buffer or the address translation cache.

15. The processing device of claim 9, wherein the pipeline controller logic is further configured to send a signals to devices which sent the functional or maintenance command, wherein the signals are used to determine when a response, generated by executing the functional or maintenance command, will be available at an output of the address translation pipeline.

16. The processing device of claim 9, wherein the pipeline controller logic is further configured to send a timing signal to a device to determine when the maintenance command can be sent to the address translation pipeline.

17. A system comprising:
one or more input/output (I/O) devices; and
a processing device, comprising an address translation pipeline for providing access to a translation look-aside buffer or an address translation cache, and pipeline controller logic configured to:
interleave, within clock cycles of the address translation pipeline, maintenance cycles with functional cycles to achieve a predetermined ratio of maintenance cycles to functional cycles,
allow functional commands, corresponding to requests for address translation, to access the address translation pipeline during a functional cycle,
select a maintenance command to gain access to the address translation pipeline during a maintenance cycle based on a predetermined order, the predetermined order requiring different maintenance command types to gain access to the address translation pipeline during consecutive maintenance cycles, and
allow the selected maintenance command, corresponding to a request to modify or read at least one of the address translation cache or the translation look-aside buffer, to access the address translation pipeline during the maintenance cycle.

18. The system of claim 17, wherein the pipeline controller logic allocates some of the pipeline cycles as maintenance cycles and the rest of the pipeline cycles as functional cycles.

19. The system of claim 17, wherein functional commands comprise requests for address translation using the translation look-aside buffer or the address translation cache.

20. The system of claim 17, wherein maintenance commands comprise at least one of an address translation cache entry invalidate, a read or write, and a fill due to an address translation cache miss.

21. The system of claim 17, wherein an address translation pipeline provides access to the translation look-aside buffer or the address translation cache.

22. The system of claim 17, wherein the pipeline controller logic is further configured to send signals to devices which sent the functional or the maintenance command, wherein the signals are used to determine when a response, generated by executing the functional or maintenance command, will be available at an output of the address translation pipeline.

23. The system of claim 17, wherein the pipeline controller logic is further configured to send a timing signal to a device to determine when the maintenance command can be sent to the address translation pipeline.

* * * * *